United States Patent [19]

Sato et al.

[11] 3,868,649

[45] Feb. 25, 1975

[54] MICROPROGRAM CONTROL SYSTEM

[75] Inventors: Kiyosumi Sato, Kawasaki; Takashi Aoki, Yokohama; Yasuyoshi Asagi, Kawasaki, all of Japan

[73] Assignee: Fujitsu Limited, Kawasaki, Japan

[22] Filed: June 26, 1973

[21] Appl. No.: 373,793

[30] Foreign Application Priority Data

June 28, 1972 Japan ................................ 47-64831
July 20, 1972 Japan ................................ 47-72748

[52] U.S. Cl. ............................................ 340/172.5
[51] Int. Cl. ............................................ G06f 9/06
[58] Field of Search ................................ 340/172.5

[56] References Cited

UNITED STATES PATENTS

| | | | |
|---|---|---|---|
| 3,614,746 | 10/1971 | Klinkhamer | 340/172.5 |
| 3,673,575 | 6/1972 | Burton et al. | 340/172.5 |
| 3,696,340 | 10/1972 | Matsushita et al. | 340/172.5 |
| 3,713,108 | 1/1973 | Edstrom et al. | 340/172.5 |
| 3,735,363 | 5/1973 | Beers et al. | 340/172.5 |
| 3,748,649 | 7/1973 | McEowen | 340/172.5 |
| 3,760,369 | 9/1973 | Kemp | 340/172.5 |

*Primary Examiner*—Gareth D. Shaw
*Assistant Examiner*—Paul R. Woods

[57] ABSTRACT

This invention relates to a microprogram control system which is adapted so that, according to the results of processing of a first set of instructions for controlling a data path unit, a second set of instructions for controlling a system control unit are provided or vice versa and that micro instructions read out from control storage means having stored therein micro instructions and the instructions given according to the results of processing of the other set of instructions can be selected at will.

9 Claims, 15 Drawing Figures

MICROPROGRAM CONTROL SYSTEM

BACKGROUND OF THE INVENTION

Description of the Prior Art

Generally, in data processing with micro programming, micro instructions can be roughly divided into a first set of instructions such as a move instruction, an arithmetic instruction, a logical instruction, a shift instruction and so on for controlling the data path, that is, data path control instructions (hereinafter referred to as a DCi), and a second set of instructions such as an execute instruction, a branch instruction, a control instruction and so on for a memory access control and a sequence control of a microprogram itself, in other words, instructions for controlling a system control unit, that is, system control instructions (hereinafter referred to as an SCi). The DCi is used for controlling the data path unit, while the SCi is used for controlling the system control unit.

Hitherto, there have been proposed micro program control systems of this kind such as that in which the DCi and SCi, after classified at their operational parts, are stored in control storage means for storing the micro instructions and then applied to a single instruction register when read out from the control storage means. Then, after decoding their operational parts, these instructions are applied to the data path unit and the system control unit respectively (refer to FIG. 1). One word is to be stored in the control storage means 1, which includes two parts for the DCi and SCi, and an instruction of one word having two instructional parts is planted in an instruction register 2 when read out. Then the DCi part and the SCi part are supplied to the data path unit and the system control unit respectively (refer to FIG. 2).

For their details, refer to "Microprogramming Principles and Practices" by Samir S. Husson, published by Prentice-Hill Inc., in 1970, pp. 212 to 217, Chapter 6: "Microprogramming the IBM System–360," Section 6.4: Model Dependent Features, Subsection 6.4.2: IBM System-360, Model 25; and pp. 239 to 242, Chapter 7: Microprogramming the IBM/360 Model 40, Section 7.9: The Mechanics of Microprogramming Model 40. Their outlines will hereinbelow be described.

In FIG. 1, reference numeral 1 indicates control storage means in which the DCi and SCi can be stored separately and from which they can be read out independently, 2 an instruction register for planting the read-out instructions, and 3 and 4 gates through which the instructions read out into the instruction register 2 are applied to the data path unit and the system control unit respectively in accordance with their operational parts.

With this system, the micro instruction DCi or SCi read out from the control storage means 1 is then stored in the instruction register 2. Then, the operational part of the planted instruction is decoded and the gate 3 or 4 is opened dependent upon whether the micro instruction is DCi or SCi. Accordingly, in the case of this system, the efficiency of utilization of bits in the control storage means 1 is high but processing is slow because the micro instruction is discriminated as to whether it is DCi or SCi after once read out into the instruction register 2. For example, in the case of reading out an SCi after a DCi requiring a two cycle time, i.e. of the cycle time of the control storage means 1, the instruction register 2 is occupied by the preceding DCi, so that the SCi following it cannot be stored in the register 2. Namely, the DCi and SCi are supplied to different units and parallel processing is possible but, in the above case, only serial processing is possible.

FIG. 2 shows a system which enables parallel processing. In the figure, reference numeral 5 designates control storage means having stored therein an instruction such as including the DCi and SCi parts in one word, and 6 an instruction register into which the instruction, that is, the DCi and SCi parts are simultaneously read out and planted.

With this system, the DCi and SCi parts of the instruction stored in the instruction register 6 are supplied to the data path control unit and the system control unit respectively. Consequently, parallel processing of the DCi and SCi is possible but, in the case where there exists many instructions such that either one of the DCi and SCi parts is unnecessary, the bit utilization efficiency of the control storage means 5 is lowered.

SUMMARY OF THE INVENTION

One object of this invention is to provide a microprogram control system which is improved from the prior art described above and in which the micro instructions DCi and SCi are planted in different registers to enable parallel processing.

Another object of this invention is to provide a microprogram control system which is adapted such that, if necessary, a microprogram SCi can be modified by a preceding microprogram DCi or a microprogram DCi can be modified by a preceding microprogram SCi.

Still another object of this invention is to provide a microprogram control system which is designed so that a micro instruction DCi or SCi can be selected at will from micro instructions read out from control storage means or those dependent upon the result of processing of the other set of instructions.

The microprogram control system of this invention comprises control storage means in which micro instructions are stored while being divided into a first set of instructions for a data path control and a second set of instructions for a memory access control and a sequence control of the microprogram itself whereby the two sets of micro instructions can be read out independently of each other, characterized in that the first and second sets of instructions read out from the control storage means are stored in predetermined separate registers respectively.

Further, the microprogram control system of this invention comprises a first instruction register for storing instructions belonging to a first set of instructions for a data path control and a second instruction register for storing instructions belonging to a second set of instructions for a memory access control and a sequence control of the microprogram itself, characterized in that both or either one of the first and second instruction registers stores therein the instructions of its set of instructions based on the processing of the other set of instructions.

BRIEF DESCRIPTION OF THE DRAWINGS

This invention will be more fully understood by reference to the following detailed description and to the accompanying drawings, in which:

FIG. 3A illustrating a general format of DCi, FIG. 3B one example of instructions in the case of modifying SCi with one DCi, FIG. 3C one example of control information which is one of SCi, FIG. 3D one example of a branch instruction which is one of SCi, and FIG. 3E one example of a branch instruction which is one of SCi and used in this invention;

DESCRIPTION OF THE PREFERRED EMBODIMENTS

With reference to the drawings, this invention will hereinafter be described.

In the prior art described previously, DCi is used for controlling the data path unit, while SCi is used for controlling the system control unit. These DCi and SCi instructions are sequentially read out from the control storage means having stored therein micro instructions and processing is carried out in accordance with the instructions read out.

With such a system, in the case where a predetermined first arithmetic instruction (one of DCi's) is carried out and then one of a plurality of arithmetic instructions, that is, a second arithmetic instruction, is selectively carried out in accordance with the arithmetic result based on the first arithmetic instruction and, further, a predetermined third arithmetic instruction is carried out, the detection of the arithmetic result of the first arithmetic instruction can be achieved with a conditional branch instruction (one of SCi's) but it is necessary to effect a branch control so as to enable the third arithmetic instruction to be carried out with the branch instruction (one of SCi's) again after the processing of the second arithmetic instruction which satisfies the predetermined condition. Namely, it is necessary to achieve the branch control twice.

However, this can be avoided by making it possible to modify the second arithmetic instruction (DCi) with the detection (SCi) of the result of the first arithmetic instruction. Namely, in the case of achieving the above processing, the second arithmetic instruction following the first one is adapted to carry out any one of a plurality of arithmetic instructions regardless of the arithmetic result of the first arithmetic instruction, so that if the second arithmetic instruction is preselected appropriately and adapted to be variable according to the arithmetic result of the first arithmetic instruction before the second arithmetic instruction is carried out, such branch control as mentioned above becomes unnecessary.

With such variable control, it is possible to reduce the number of steps of the microgram and hence speed up the processing.

Further, it is desired to effect processing by which a branch address of the branch instruction, which is one of the SCi's, in accordance with the content of the data handled previously based on the DCi and it is further desired that the SCi following the DCi may be modified by the latter, thereby to render the software adaptable.

As described previously, the microprogram control system of this invention is designed such that the subsequent micro instructions DCi or SCi can be selected, as desired, by either one of the micro instruction read out from the control storage means whereby the instruction read out is dependent upon the processing result of the other set of micro instructions as described previously. The instruction format for use in the present invention will hereinbelow be described.

Figure 3A:
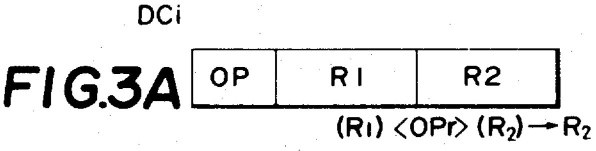
FIGS. 3A to 3E show one example of an instruction format for use in this invention.
Figure 3B:
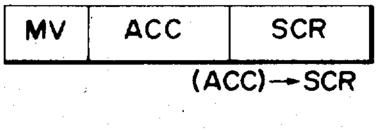

FIG. 3A shows the case of a usual format of the DCi, in which an instructed operation is achieved with the use of the contents of addresses $R_1$ and $R_2$ in an operation code area OP and is stored in the address $R_2$. Consequently, in the case where a subsequent SCi is formed by using the content of an accumulator, it is possible to employ a micro instruction for moving the content of the accumulator ACC to an instruction register SCR in which the subsequent SCi is to be stored, as depicted in FIG. 3B. This move instruction is a DCi.

Figures 3C, 3D, 3E:
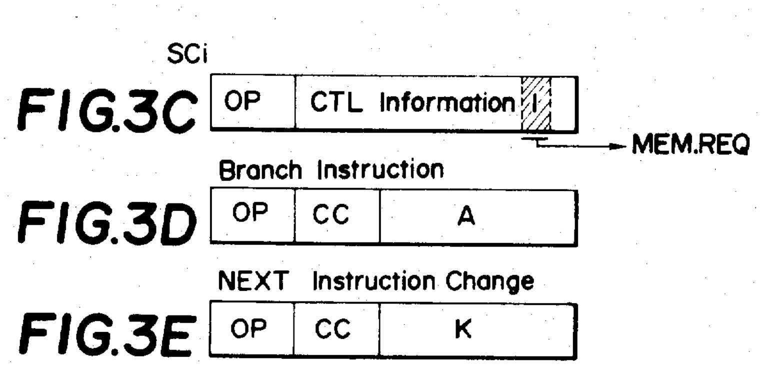

FIG. 3C shows a control information instruction format of the SCi, in which the system control unit is usually controlled dependent upon whether a bit at a predetermined position in a control information (CTL information) area is "1" or "0". FIG. 3C generally illustrates the case where, for example, a memory request is made by the bit 1. Such a branch instruction as shown in FIG. 3D is also a SCi and such a NEXT instruction modifying instruction as depicted in FIG. 3E is employed for the modification of the DCi with the SCi.

Figure 1:
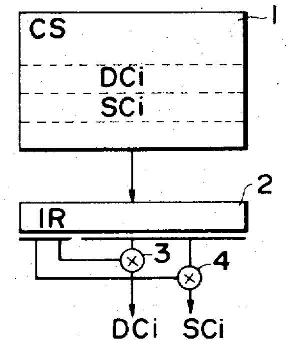
FIG. 1 PRIOR ART
FIGS. 1 and 2 are block diagrams schematically illustrating conventional microprogram control systems, respectively.
Figure 2:
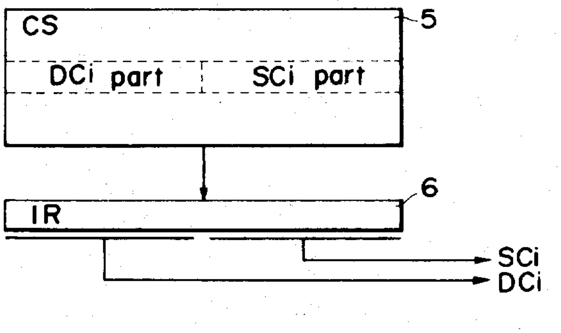
FIG. 2 PRIOR ART
Figure 4:
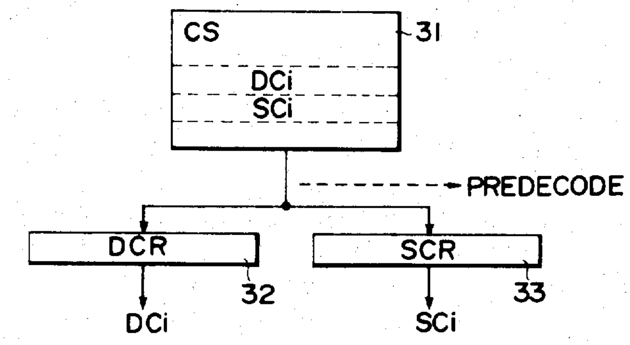
FIG. 4 is a schematic diagram showing one example of a control system of this invention.
Figure 5:
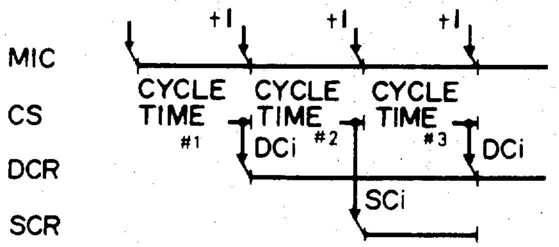
FIG. 5 illustrates one example of a time chart for a microprogram control in the example of FIG. 4.

FIG. 4 is a schematic diagram, for explaining the system of this invention. In the figure, reference numeral 31 indicates control storage means, 32 an instruction register DCR (a data path control register) for exclusively storing the DCi and, 33 an instruction register SCR (a sequence control register) for exclusively storing the SCi. When the micro instruction DCi or SCi is read out from the control storage means 31 which is adapted so that the DCi and SCi are separately stored therein and read out therefrom independently of each other, the operational part of the instruction is previously decoded. If the micro instruction is DCi, it is planted in the instruction register 32 and if the micro instruction is SCi, it is planted in the instruction register 33. Then, the DCi is supplied to the data path control unit and the SCi is supplied to the system control unit. With this system, the bit utilization efficiency of the control storage means 31 is equal to that in the system of FIG. 1 and parallel processing of the DCi and SCi is possible as is the case with the system of FIG. 2. A time chart of the parallel processing is shown in FIG. 5. In the figure, reference character MIC indicates a micro instruction counter for access to the control storage means CS (corresponding to that 31 in FIG. 4), DCR the instruction register 32 shown in FIG. 4, and SCR the instruction register 33 in FIG. 4.

Where the control storage means CS is accessed by the micro instruction counter MIC in the cycle time No. 1, the operation part of the micro instruction to be read out is previously decoded as indicated by circles and if the instruction is the DCi, it is stored in the instruction register DCR. If the processing of the DCi requires two cycle times, the instruction register DCR is thereby occupied for that period of time. In the cycle time No. 2, the micro instruction counter MIC performs the addition of +1 and a subsequent instruction is read out from the control storage means CS. If the instruction at this time is the SCi, it is decoded beforehand and planted in the instruction register SCR. Namely, as will be apparent from the figure, in the cycle time No. 3, parallel processing of the DCi and SCi is possible even if such a micro instruction as requiring two cycles is present before the cycle time No. 3.

The separate provision of the instruction registers 32 and 33 such as depicted in FIG. 4 enables not only parallel processing such as described previously with regard to FIG. 5 but also such modification of a subsequent SCi with the preceding DCi or a subsequent DCi with the preceding SCi as will be described later in convention with FIG. 8.

Figure 6:
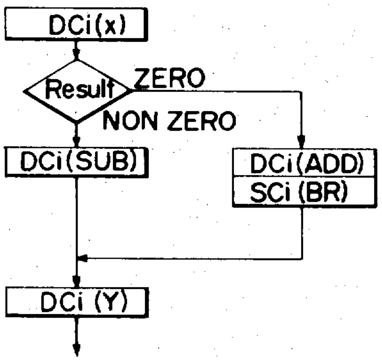
FIG. 6 shows one example of a flow chart representing such processing which is branched into a predetermined routine and then restored under predetermined conditions.

FIG. 6 is a schematic diagram, for explaining advantages resulting from the modification of the subsequent DCi. Let it be assumed to follow such procedure that where the arithmetic result of a certain arithmetic instruction DCi(X) is zero, a DCi for an addition (ADD) is carried out, that where it is not zero, a DCi for a subtraction (SUB) is carried out and that, thereafter, an arithmetic instruction is practised.

With one conventional processing method, a conditional branch instruction, which is an SCi, is established; if the arithmetic result is zero, the DCi (ADD) is carried out; if it is not zero, the DCi (SUB) is carried out; a branch instruction (SCi) is then practised; and then the required arithmetic instruction DCi(Y) is carried out. However, this method requires the branch instruction, which is one of the SCi's, for returning to the initial condition after the addition with the DCi (ADD).

While, in the present invention, where such processing procedures as depicted in FIG. 6 are carried out, the DCi(X), the SCi (the NEXT instruction modifying instruction), the DCi (SUB) and the DCi(Y) are sequentially stored in the control storage means (described later with regard to FIG. 8); if the arithmetic result of the DCi(X) is zero, the DCi (ADD) is retrieved from an instruction table (described later) by the NEXT instruction modifying instruction without setting the DCi (SUB) as a subsequent micro instruction in the instruction register; and then the DCi(X) is read out again from the control storage means and set in the instruction register. This decreases the number of steps and speeds up the processing.

Figure 7:
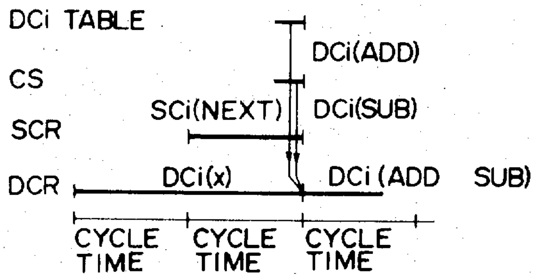
FIG. 7 illustrates one example of a time chart in the case of modifying DCi with SCi.

A time chart in this case is shown in FIG. 7. Namely, the NEXT instruction modifying instruction SCi (NEXT) is set in the instruction register SCR for planting therein the SCi's, thereby to examine whether a previous arithmetic result is zero or not. If the arithmetic result is zero, an instruction table DCi TABLE is retrieved and the DCi (ADD) is set in the instruction register DCR for planting therein the DCi's. If the arithmetic result is not zero, the DCi (SUB) is set in the instruction register DCR from the control storage means CS.

Figure 8:
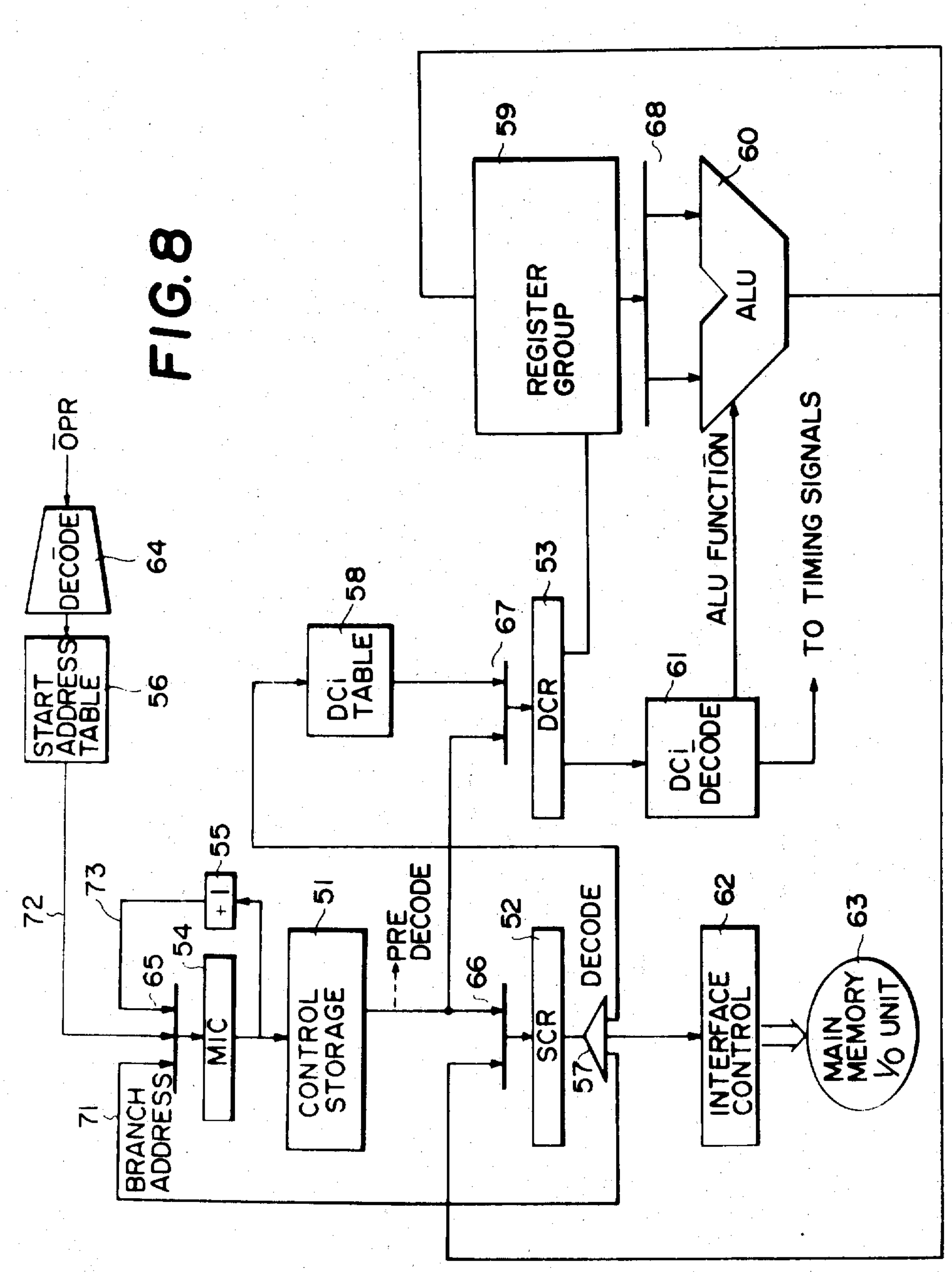
FIG. 8 is a block diagram showing one example of the construction of a control apparatus embodying this invention.

FIG. 8 illustrages one example of the system of this invention. In the figure, reference numeral 51 designates control storage means which is capable of storing the DCi and SCi and reading them out therefrom independently of each other; 53 an instruction register which plants or receives therein the micro instruction DCi read out from the control storage means 51; 52 an instruction register which plants therein the micro instruction SCi read out from the control storage means 51; 54 a micro instruction counter which accesses a predetermined address of the control storage means 51 for reading out therefrom the micro instruction (DCi or SCi) stored at a predetermined address; 55 a +1 circuit; 56 a start address table for indicating a start address; 57 a decoder; 58 a DCi planting table for storing a limited number of DCi's; 59 a register group including an accumulator, an operational register, an address register and so on which are utilized for the operation by the DCi and in which data of the arithmetic result and so on are set; 60 an arithmetic adder and logical unit ALU; 61 a DCi decoder DCi DECODE; 62 an interface control unit; 63 a main memory input/output unit; and 65, 66 and 67 OR gates.

A description will be given of the usual read-out operation described previously with regard to FIG. 4. When address information has been set by the start address indicating table 56 or a branch instruction in the micro instruction counter 54, the micro instruction DCi or SCi in the set of addresses is stored in the appropriate instruction register 53 or 52. Thereafter, so long as a branch address is not set by the branch instruction, the content of the micro instruction counter 54 is added with +1 by the +1 circuit 55 and subsequent micro instructions are sequentially read out at every addition. At the time of reading out the micro instruction, the operational part of the instruction is previously decoded and if the micro instruction is DCi, it is stored in the instruction register 53 through the OR gate 67 and used for controlling the data path unit. If the instruction is SCi, it is stored in the instruction register 52 through the OR gate 66 and used for controlling the system control unit.

Next, a description will be made in connection with the case where a subsequent DCi is modified by an SCi preceding it. This case is convenient for carrying out such processing as described previously in respect of FIGS. 6 and 7.

The NEXT instruction modifying instruction such, for example, as shown in FIG. 3E, which is an SCi, is read out into the instruction register 52 and stored therein. At this time, the instruction examines the arithmetic result by the DCi previously processed, for example, such a condition as "zero", "positive", "negative" or "carry" of an adder output and when a predetermined condition is present, a predetermined address of the DCi planting table 58 is retrieved through the decoder 57. Then, the DCi stored at that address is set in the instruction register 53 through the OR gate 67 and an operation according to the DCi is achieved. Namely, a subsequent DCi is usually read out from the control storage means 51 but reading-out therefrom is disabled and the DCi from the DCi planting table 58 is set in the instruction register 53.

Next, a description will be given of the case where a subsequent SCi is modified by a DCi preceding it.

In this case, a move instruction such as shown, for example, in FIG. 3B, is read out into the instruction register 53 and planted therein. As shown in FIG. 3B, this instruction implies that the content of the accumulator (included in the register group 59) at that instant should be moved to the instruction register 52 and the content of the accumulator at that instant is set in the instruction register 52 through the OR gate 66 and the subsequent SCi is determined by the content set in the instruction register 52 and carried out. In this case, the subsequent SCi is usually read out from the control storage means 51 but reading-out therefrom is disabled and the register group 59 is determined by the contents of the accumulator, the operational register, the address register and so on and set in the instruction register 52. The processing for modifying and determining the subsequent SCi by the preceding DCi is extremely advantageous, for example, in the case where the branch address of the branch instruction, which is an SCi, is determined by the contents of the accumulator and so on.

As has been described in the foregoing, in the present invention, the DCi resulting from the retrieval of the DCi planting table 58 by the SCi can be set in the instruction register 53 for the DCi, while the contents of the accumulator and so on (included in the register group 59) can be set by the DCi in the instruction register 52 for the SCi, so that the number of steps of the micro instructions stored in the control storage means 51 can be reduced and, at the same time, the adaptability of the software can be enhanced.

Figures 9A, 9B:
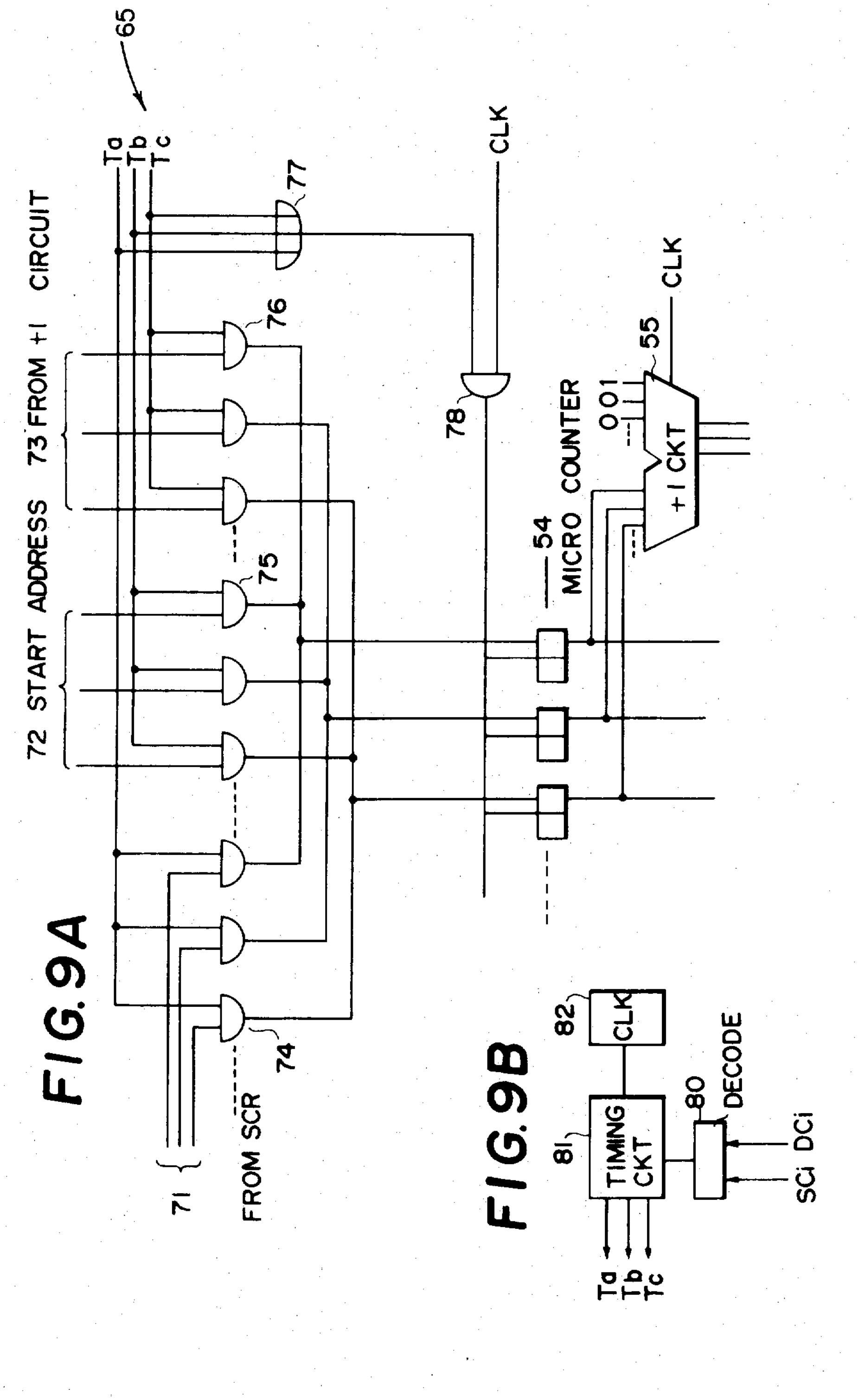
FIGS. 9A and B, and 10 are wiring diagrams, each showing one part of the illustrative circuit depicted in FIG. 8.

Referring to FIGS. 9A and 9B, main circuits shown in FIG. 8 will be described, parts corresponding to those in FIG. 9 are marked with the same reference numerals.

FIG. 9A illustrates concrete constructions of the OR gate 65, the micro instruction counter 54 and the +1 circuit 55. FIG. 9B shows a timing circuit. In FIG. 9A, reference numeral 71 identifies a branch address from the SCR 52 (FIG. 8); 72 an input from the start address table 56; 73 an input from the +1 circuit 55; 74, 75, 76 and 78 AND gates; and 77 an OR gate. The micro instruction counter 54 is formed with a plurality of flip-flops. Timing clock pulses T*a*, T*b* and T*c* are produced by the circuit depicted in FIG. 9B. In the figure, reference numeral 80 indicates a decoder, 81 a timing circuit, and 82 a clock circuit. The SCi and DCi information is applied through the decoder 80 to the timing circuit 81 to control it. The timing circuit 81 is synchronized with the clock circuit 82 to provide the required timing pulses T*a*, T*b* and T*c*. In FIG. 9A, the timing pulses T*a*, T*b* and T*c* produce AND outputs with the inputs 71, 72 and 73 and the micro instruction counter 54 is adapted to be driven by the timing pulses from the OR gate 77 and the AND gate 78.

Figure 10:
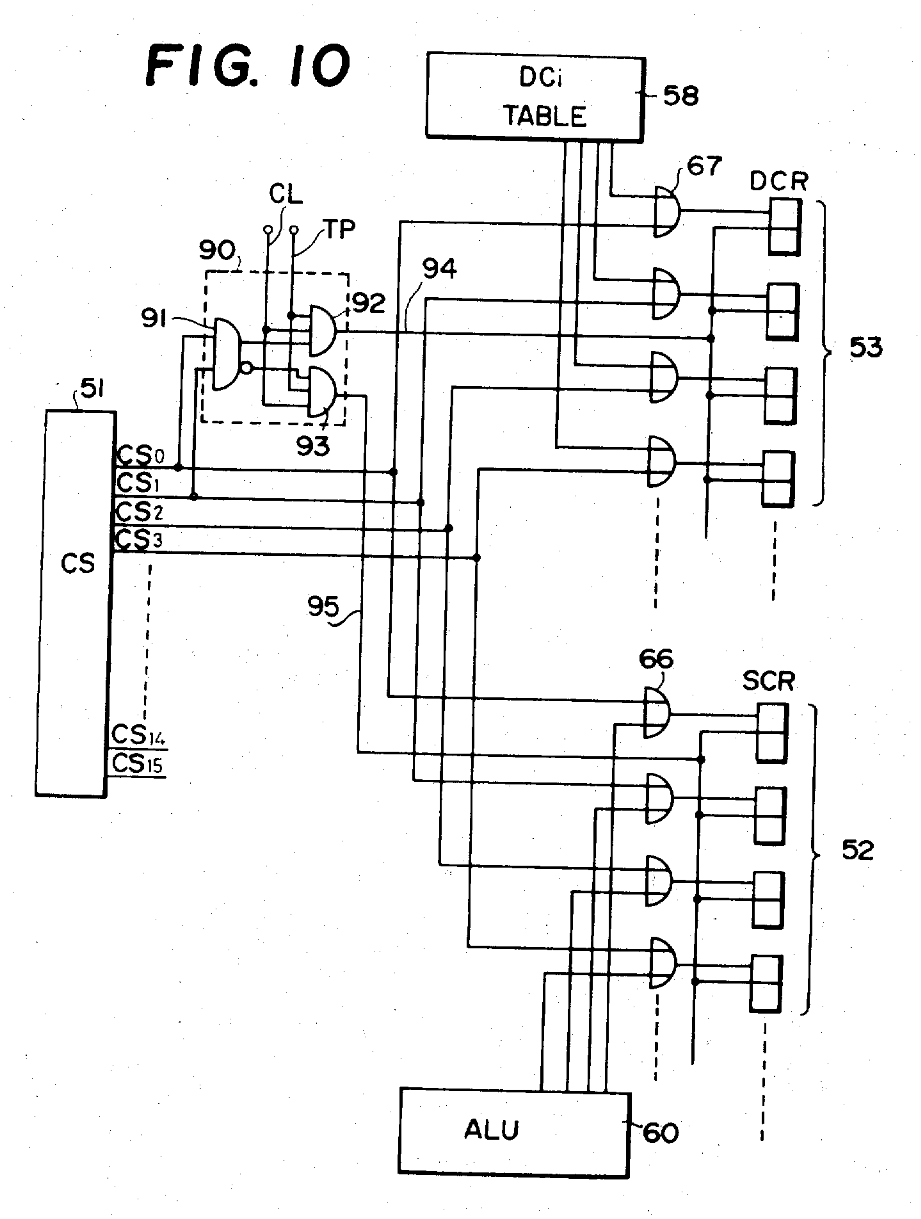

FIG. 10 illustrates circuit constructions of a pre-decoder circuit indicated by a broken line in FIG. 8 and the OR gates 66 and 67, the sequence control register SCR 52 and the data path control register DCR 53. In the figure, reference numeral 90 designates a pre-decoder circuit, which produces control outputs 94 and 95 for the DCR 53 and the SCR 52 having AND gates 92 and 93 coupled to the AND and NAND gate 91, in response to only two outputs $CS_0$ and $CS_1$ of 16 outputs $CS_0$ to $CS_{15}$ of the control storage means 51, a clock pulse CL and an operation control timing pulse. The OR gate 67 produces an OR output between the output of the control storage means 51 and that of the DCi table 53 and the data path control register 53 of the flip-flop construction is driven by the output 94 of the pre-decoder circuit 90. In a similar manner, the OR gate 66 provides an OR output between the output of the control storage means 51 and the arithmetic adder and logical unit 60 and the sequence control register 52 of the flip-flop construction is driven by the output 95 of the pre-decoder circuit 90.

The foregoing has described the system of this invention and its concrete circuits. It is a matter of course that known circuits are selectively employed as the circuits of the above-described block diagrams by those skilled in the art and it is needless to exemplify the counter circuit, the timing circuit, the logic circuit, the flip-flop circuit and so on. These circuits may be those shown, for example, in "Pulse, Digital and Switching Waveforms, Devices and Circuits for their generation and Processing," Sections 18, 9 and 10, by Jacob Millman, Herbert Taub, published by McGraw-Hill Book Company.

It will be apparent that many modifications and variations may be effected without departing from the scope of the novel concepts of this invention.

We claim:

1. A microprogram control system comprising control storage means for storing micro instructions and including means for dividing the micro instructions into a first set of micro instructions for controlling a data path and a second set of micro instructions for memory access control; sequence control means for reading out from said storage means in accordance with a microprogram the first and second sets of instructions independently of each other; and first and second registers for receiving respectively the first and second sets of instructions read out from said control storage means.

2. A microprogram control system comprising a first instruction register for receiving therein instructions belonging to a first set of instructions for controlling a data path, and a second instruction register for receiving therein instructions belonging to a second set of instructions for a memory access control and a sequence control of a microprogram itself, which is characterized in that at least one of said first and second instruction registers receives therein the instructions of its set of instructions based on the processing of the other set of instructions.

3. A microprogram control system according to claim 2, comprising control storage means for storing micro instructions and including means for dividing the micro instructions into a first set of instructions for controlling a data path and a second set of instructions for memory access control and sequence control of a microprogram itself, means for reading out from said storage means the first and second sets of instructions independently of each other, a first instruction register for receiving the first set of micro instructions read out from said control storage means, a second instruction register for receiving the second set of micro instructions read out from said control storage means, and memory means for storing in either of said first and second instruction registers its micro instructions in accordance with another set of micro instructions stored in the other of said instruction registers, in which one of said first and second instruction registers selects and receives therein, as its micro instructions, one of the micro instructions read out from said control storage means and from said memory means in accordance with the other set of micro instructions received in the other of said instruction registers.

4. A microprogram control system comprising:

a. control storage means for storing micro instructions, said storage means including a first portion for receiving a first set of micro instructions for controlling a data path and a second portion for receiving a second set of micro instructions for memory access control;

b. sequence control means for reading out from said storage means in accordance with a microprogram the first and second sets of instructions independently of each other; and c. first and second registers for receiving, respectively, the first and second sets of instructions read out from said control storage means.

5. The microprogram control system as claimed in claim 4, wherein there is further included memory means for storing in one of said first and second instruction registers its micro instructions in accordance with another set of micro instructions stored in the other of said instruction registers.

6. The microprogram control system as claimed in claim 4, wherein said sequence control means includes a micro instruction counter means for accessing a predetermined address of said control storage means and for reading out therefrom one of the first and second sets of instructions in accordance with the predetermined address.

7. The microprogram control system as claimed in claim 6, wherein said sequence control means further includes an incremental address circuit responsive to the reading out of an instruction from said control storage means for incrementing the address set by said micro instruction counter means.

8. The microprogram control system as claimed in claim 4, wherein there is included decoder means associated with said first register for determinig whether a predetermined condition has been met, and memory means for storing selected instructions of said first set and responsive to an indication by said decoder that the predetermined condition has been met for applying selected of the stored instructions of the first set to said second register.

9. The microprogram control system as claimed in claim 4, wherein there is included a a register group associated with said second register for processing accumulated instructions derived therefrom and wherein said register group is responsive to an accumulation of instructions therein for determining which of its instructions set in said first register are to be carried out.

* * * * *

UNITED STATES PATENT OFFICE
CERTIFICATE OF CORRECTION

Patent No. 3,868,649 Dated February 25, 1975

Inventor(s) Kiyosumi Sato, Takashi Aoki, and Yasuyoshi Asagi

It is certified that error appears in the above-identified patent and that said Letters Patent are hereby corrected as shown below:

Column 4, line 35, change "1" to --"1"--.
Column 4, line 52, change "planted" to --stored--.
Column 5, line 1, change "operation" to --operational--.
Column 5, line 11, change "planted" to --stored--.
Column 5, lines 57 and 58, change "planting" to --storing--.
Column 5, line 62, change "planting" to -- storing --
Column 6, line 3, change "plants" to --stores--.
Column 6, line 5, change "plants" to --stores--.
Column 6, line 12, change "planting" to --storing--.
Column 6, line 53, change "planting" to --storing--.
Column 6, line 59, change "planting" to --storing--.
Column 6, line 65, change "planted" to --stored--.
Column 7, line 19, change "planting" to --storing--.

Signed and Sealed this

*fourth* Day of *November 1975*

[SEAL]

*Attest:*

RUTH C. MASON
*Attesting Officer*

C. MARSHALL DANN
*Commissioner of Patents and Trademarks*